Patented Aug. 13, 1940

2,211,209

UNITED STATES PATENT OFFICE 2,211,209

DAIRY PRODUCT AND STABILIZER THEREFOR

Edward C. Johnston, Milwaukee, Wis., assignor to Robert A. Johnston Company, Milwaukee, Wis., a corporation of Wisconsin No Drawing. Application December 8, 1939, Serial No. 308,296

8 Claims. (Cl. 99—25)

This application is a continuation in part of the copending application of Edward C. Johnston, filed July 14, 1938, Serial No. 219,201, for Dairy product and stabilizer therefor.

The invention presented herein relates to stabilizers for dairy products and refers particularly to a stabilizer for chocolate milk, which is a dairy preparation made by adding a suitably prepared cocoa powder to milk.

Naturally, a stable product not subject to precipitation is a criterion of quality in a beverage of this type, but it has always been difficult to maintain the cocoa powder in suspension and prevent its precipitation.

This invention, therefore, contemplates as one of its objects, the provision of an improved stabilizer for use in a dairy product of the character described which has the capacity of holding the cocoa powder in suspension and assuring the desired stability.

Irish moss has been found suitable as the base of a stabilizer which has the properties of holding the cocoa in suspension. However, the use of Irish moss alone does not meet the problem; for when the amount of Irish moss used is sufficient to effect complete suspension, it jells and this is objectionable.

This invention, therefore, contemplates as a further object the provision of a compound containing Irish moss and an ingredient capable of spreading the range between sediment and jell so as to overcome the critical characteristics of Irish moss.

Another object of this invention is to provide a stabilizer of the character described which may be made in dry powdered form to facilitate its embodiment in the dairy powder, which consists essentially of a powdered cocoa and sugar mixture.

Irish moss and other equivalent vegetable gums being hydrophilic colloids are affected by moisture; and as the commercial product in which the stabilizer of this invention is used is in powdered form, the hot humid conditions prevalent in dairies would have a deleterious effect upon the strength of the Irish moss, and consequently, the permanence of the stability, unless protected.

This invention thus has, as a further object, the provision of a stabilizer which utilizes the stabilizing characteristics of Irish moss or an equivalent vegetable gum and which contains an ingredient to react therewith and protect it against loss of jelling power.

With the above and other objects in view which will appear as the description proceeds, this invention resides in the novel combination of ingredients as hereinafter described and more particularly defined by the appended claims, it being understood that such changes in the precise embodiment of the hereindisclosed invention may be made as come within the scope of the claims.

The ingredients of the stabilizer of this invention are: A hydrophilic colloid, such as vegetable gums like Irish moss, both select and the ordinary type; a hydrophilic lipin of the edible class, such as glyceryl mono stearate; and tri sodium phosphate. At typical batch of the stabilizer is formed from these ingredients in the following proportions:

Select Irish moss (pulverized) _____ lbs__ 20
Ordinary Irish moss (pulverized) _____ lbs__ 20
Glyceryl mono stearate_____ lbs__ 9
Tri sodium phosphate_____ ozs__ 8

The process of making the stabilizer is as follows:

The two grades of Irish moss, the glyceryl stearate, and the tri-sodium phosphate with the addition of ten times their weight of water are heated in a mixing kettle. Preferably, the heating is done by direct steam injection which adds to the moisture content and also serves as an agitator to insure complete admixture of the ingredients. The temperature is brought to the boiling point and held at that degree for approximately thirty minutes during which time the steam circulates through the batch, the odor of the Irish moss being carried off in the escaping steam.

The batch is then pumped to an atmospheric double drum drier or its equivalent, and all but approximately one to six per cent of its moisture content is removed. Where a drier of the type described is employed, the moisture is, of course, removed by the heated rolls. The material comes off the drier in flake form, and it is then pulverized which makes it ready to be incorporated in the dairy powder from which the chocolate milk and other dairy products are made.

The Irish moss or some other suitable hydrophilic colloid that may be used has its tendency to jell retarded by the tri-sodium phosphate so that the range between sediment and jell is spread.

The glyceryl mono stearate or its equivalent from the class of edible nonpoisonous hydrophilic lipins to some extent coacts with the tri-sodium phosphate in spreading the range between sediment and jell, but its primary function is to protect the Irish moss against loss of strength or stabilizing characteristics after the product is sent out into the trade and is subjected to the hot humid conditions prevalent in dairies, it being remembered that the commercial product is in powdered form.

The formula for a typical batch of the dairy powder is as follows:

| | Pounds |
|---|---|
| Powdered stabilizer (made as above described) | 100 |
| Powdered sugar | 200 |
| Cocoa powder | 561 |
| Salt | 18½ |
| Vanillin | 2 |

These ingredients are thoroughly mixed in any suitable powder mixer.

This thoroughly mixed powdered product is then ready for sale to the trade and when added to milk in the proper proportions, produces a stable chocolate milk beverage.

It may be desirable in some instances to rework returned dairy powder or powder that is not for some reason or other suitable for sale. In that event, the rerun powder is added to the stabilizer mixture hereinbefore described in the proportion of twenty-five pounds to the amounts hereinbefore mentioned, and the glycerol mono stearate is increased from nine to ten pounds.

Dairy products made from the powder hereindescribed have remarkable stability and their viscosity can go as high as one hundred and ninety seconds without jelling. This combination of ingredients also has the advantage of protecting the Irish moss against loss of its jelling power through oxidation by exposure to air or warm and humid conditions.

Hence, it will be seen that this invention serves a valuable adjunct to the dairy industry.

What I claim as my invention is:

1. A dry powdered stabilizer for dairy products and the like comprising: an admixture of dry powdered Irish moss and dry powdered glyceryl mono stearate in approximately the quantities of forty and nine pounds, respectively.

2. A dry powdered stabilizer for dairy products and the like comprising: an admixture of dry powdered vegetable gum and a dry powdered glyceryl stearate in approximately the quantities of forty and nine pounds, respectively, and to which is added a slight amount of tri-sodium phosphate.

3. A stabilizer for dairy products and the like in which a vegetable gum like Irish moss is used as a jelling agent characterized by the addition of an amount of glyceryl stearate for the purpose of protecting the gum against loss of its jelling power when subjected in powdered form to hot humid atmospheres and for spreading the range between sedimentation and jelling when the stabilizer is in a powder and liquid mixture.

4. A powdered stabilizer for dairy products and the like which consists essentially of milk and cocoa comprising: an admixture of powdered vegetable gum like Irish moss and a powdered hydrophilic lipin like glyceryl mono stearate.

5. A food powder adapted to be added to milk to form a beverage and the like comprising essentially: an admixture of sugar, cocoa, Irish moss and glyceryl mono stearate.

6. As an article of manufacture, a powdered food product comprising: an admixture of powdered sugar, powdered cocoa, a flavoring, Irish moss and glyceryl mono stearate.

7. As an article of manufacture, a powdered food product comprising: an admixture of powdered sugar, powdered cocoa, a flavoring, Irish moss, glyceryl mono stearate and a slight amount of tri-sodium phosphate.

8. A stabilizer for dairy products and the like in which a vegetable gum like Irish moss is used as a jelling agent characterized by the addition of an amount of a glyceryl stearate for the purpose of protecting the gum against loss of its jelling power when subjected in powdered form to hot humid atmospheres and for spreading the range between sedimentation and jelling when the stabilizer is in a powder and liquid mixture; and characterized further by the addition of a small amount of tri-sodium phosphate for the purpose of retarding the action of the gum.

EDWARD C. JOHNSTON.